United States Patent
Hultine et al.

(10) Patent No.: US 11,591,533 B1
(45) Date of Patent: Feb. 28, 2023

(54) REMOVAL OF HYDROGEN SULFIDE AND OTHER ACIDS FROM HYDROCARBON GAS

(71) Applicants: J. Dustin Hultine, Milwaukie, OR (US); Robert Kurt Graupner, Hillsboro, OR (US)

(72) Inventors: J. Dustin Hultine, Milwaukie, OR (US); Robert Kurt Graupner, Hillsboro, OR (US)

(*) Notice: Subject to any disclaimer, the term of this patent is extended or adjusted under 35 U.S.C. 154(b) by 0 days.

(21) Appl. No.: 17/932,814

(22) Filed: Sep. 16, 2022

Related U.S. Application Data

(60) Provisional application No. 63/266,456, filed on Jan. 5, 2022.

(51) Int. Cl.
*C10L 3/10* (2006.01)
*B01D 53/04* (2006.01)
*B01D 53/14* (2006.01)

(52) U.S. Cl.
CPC .......... *C10L 3/103* (2013.01); *B01D 53/0438* (2013.01); *B01D 53/1468* (2013.01); *B01D 2253/112* (2013.01); *B01D 2257/304* (2013.01)

(58) Field of Classification Search
None
See application file for complete search history.

(56) References Cited

U.S. PATENT DOCUMENTS

| | | |
|---|---|---|
| 7,494,637 B2 | 2/2009 | Peters et al. |
| 11,180,371 B2 | 11/2021 | Hultine et al. |
| 2008/0307794 A1 | 12/2008 | Graupner et al. |
| 2011/0123428 A1 | 5/2011 | Liu et al. |

FOREIGN PATENT DOCUMENTS

| | | |
|---|---|---|
| DE | 1229053 B | 11/1966 |
| DE | 4339403 A1 | 5/1995 |
| FR | 2709121 A1 | 2/1995 |
| GB | 771310 A | 3/1957 |
| WO | 2005108289 A2 | 11/2005 |
| WO | 2007134789 A2 | 11/2007 |
| WO | 2008115662 A2 | 9/2008 |
| WO | 2009056888 A1 | 5/2009 |
| WO | 2012123378 A1 | 9/2012 |
| WO | 2012123380 A2 | 9/2012 |
| WO | 2014037918 A1 | 3/2014 |
| WO | 2020210252 A1 | 10/2020 |

OTHER PUBLICATIONS

"As The World Decarbonizes, Sulfuric Acid May Be In Short Supply," Science Friday, Available Online at https://www.sciencefriday.com/segments/sulfuric-acid-supply-shortage/, Sep. 9, 2022, 5 pages.

(Continued)

*Primary Examiner* — Daniel Berns
(74) *Attorney, Agent, or Firm* — Alleman Hall Creasman & Tuttle LLP

(57) ABSTRACT

A method to purify a hydrocarbon gas with hydrogen sulfide as an impurity comprises: (a) charging a chamber with a bed of active-metal carbide of a predetermined mesh-size range; (b) conducting the hydrocarbon gas through the bed of active-metal carbide, forming additional hydrocarbon gas by reaction of the active-metal carbide and the hydrogen sulfide; and (c) filtering from the chamber the hydrocarbon gas without the hydrogen sulfide.

13 Claims, 7 Drawing Sheets

(56) References Cited

OTHER PUBLICATIONS

Kim, C. et al., :"CaC, Production from CaO and Coal or Hydrocarbons in a Rotating-Arc Reactor," Industrial & Engineering Chemistry Process Design and Development, vol. 18, No. 2, Apr. 1, 1979, 6 pages.

Maslin, M. et al., "Sulfur: A potential resource crisis that could stifle green technology and threaten food security as the world decarbonises," The Geographical Journal, vol. 188, No. 4, Aug. 21, 2022, 8 pages.

Forgione, P., "Cyanamides," Ullmann's Encyclopedia of Industrial Chemistry, vol. A 8, 1987, 9 pages.

REMOVAL OF HYDROGEN SULFIDE AND OTHER ACIDS FROM HYDROCARBON GAS

CROSS REFERENCE TO RELATED APPLICATIONS

This application claims priority to U.S. Provisional Patent Application Ser. No. 63/266,456, filed 5 Jan. 2022, the entirety of which is hereby incorporated herein by reference for all purposes.

TECHNICAL FIELD

This disclosure relates generally to the field of chemical engineering and more specifically to purification of hydrocarbon gases.

BRIEF DESCRIPTION OF THE DRAWINGS

The invention will be better understood from reading the following Detailed Description with reference to the attached drawing figures, wherein.

DETAILED DESCRIPTION

Figure 1:
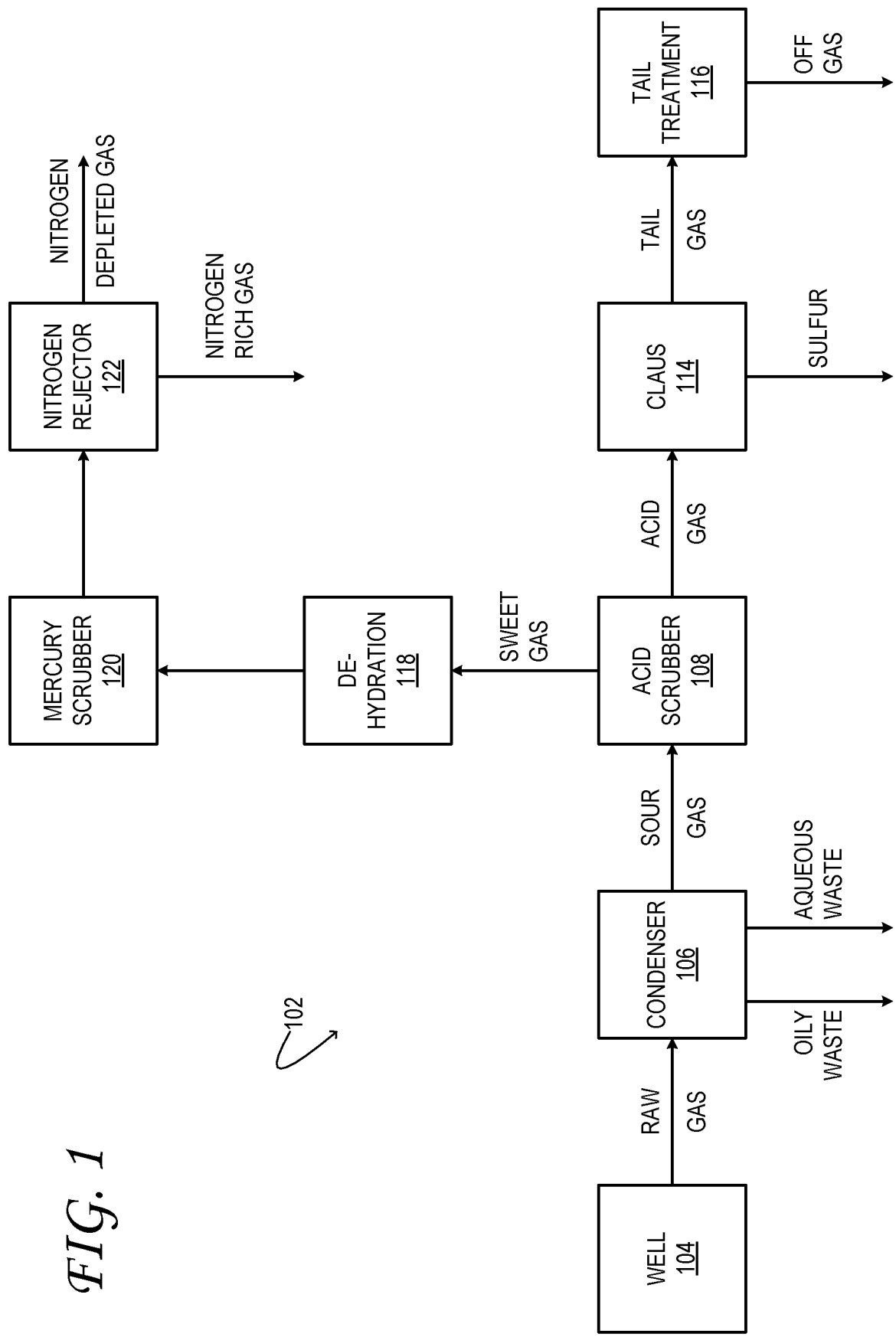
FIG. 1 shows aspects of an example gas-treatment facility for purifying a hydrocarbon gas.

Hydrocarbon gases are valuable as fuels and as starting materials for chemical synthesis. The term 'hydrocarbon gas' refers herein to any gas including, as a primary component, one or more chemical compounds $C_xH_y$, where x and y are each greater than or equal to one. Such chemical compounds are 'hydrocarbons' if they comprise no chemical element other than carbon and hydrogen. Hydrocarbons may include unsaturated alkanes and also alkenes and alkynes of any degree of unsaturation. Hydrocarbons may be branched, non-branched, cyclic, acyclic, aliphatic, and/or aromatic. The term 'hydrocarbon gas' should not be construed to limit the boiling point of the hydrocarbons therein; it does not require (nor does it proscribe) that the hydrocarbons are gases at standard temperature and pressure (STP). In some stages of refinement, a hydrocarbon gas may also include, in addition to the primary hydrocarbon component, substances that are not hydrocarbons.

The skilled reader will appreciate that practically all organic chemicals and synthetic polymers are manufactured from petroleum hydrocarbons as initial starting materials. Indeed most commodity organic chemicals are sourced from petroleum at low cost and high efficiency. That in itself is a sound reason to discourage depletion of petroleum resources globally, for sourcing commodity organic chemicals from the biosphere would be astronomically more expensive and more burdensome environmentally. Nevertheless, the vast majority of the hydrocarbon extracted from the earth is used as fuel. Hydrocarbons release their energy conveniently via combustion and are among the most energy-dense fuels that exist. Moreover, hydrocarbons are easy to store and transport. In many parts of the world, the most abundant and least expensive hydrocarbon fuels are hydrocarbon gases.

The various modes of global hydrocarbon consumption can be re-examined through the lens of anthropogenic climate change. Generally speaking, turning hydrocarbons into materials and commodity chemicals other than fuel can be carbon-neutral. Moreover, in scenarios in which a volatile hydrocarbon would otherwise be released into the atmosphere (notably methane which has a high global-heating effect), harvesting the hydrocarbon to avert its release may be advantageous no matter the end use. By contrast, combustion of hydrocarbons harvested from below the biosphere is carbon-positive, as carbon dioxide ($CO_2$) is invariably released into the atmosphere,

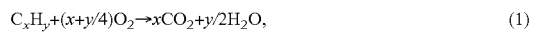

$$C_xH_y + (x + y/4)O_2 \rightarrow xCO_2 + y/2 H_2O, \qquad (1)$$

Combustion of hydrocarbons derived from biomass has at least the potential of being carbon-neutral, assuming that the biomass is ultimately replenished via photosynthesis. In view of the context above, some species of hydrocarbon gases are enumerated below.

'Natural gas' is hydrocarbon gas from a well, comprising mostly methane. 'Biomethane' is hydrocarbon gas from anaerobic digestion of biomass. 'Cow gas' or 'livestock-waste digester gas' is biomethane sourced particularly from the livestock industry. 'Sewer gas' is biomethane from human bodily discharge. 'Flare gas' is excess hydrocarbon gas released in petroleum drilling or refinement or biodiesel production. Flare gas is also emitted by sewage digesters and coal gasification, and other industrial processes. 'Producer gas' is not a hydrocarbon gas per se but is applicable to the methods herein. Producer gas is a mixture comprising carbon monoxide (CO) and hydrogen ($H_2$), which derives from the gasification of solid organic matter such as coal, wood, lignin, and other forms of biomass. In some scenarios producer gas may be used as fuel. In other scenarios producer gas may be reformed to yield 'reformer' or 'synthesis' gas, which comprises methane and is therefore a hydrocarbon gas. Some reforming and/or gasification strategies add hydrogen to the producer gas, the hydrogen reducing carbon monoxide and enriching the hydrocarbon content of the gas. In some scenarios such hydrogen may derive from a non-hydrocarbon (e.g., electrolytic) source.

The hydrocarbon gases listed above natively comprise at least some non-hydrocarbon substances that may be undesirable for end use or downstream processing. Example non-hydrocarbon substances include water vapor, carbon dioxide carbon monoxide, hydrogen, nitrogen ($N_2$), ammonia ($NH_3$), hydrogen sulfide ($H_2S$), mercury, and mercury compounds. Accordingly, hydrocarbon gas may be admitted to a gas-treatment facility to reduce the levels of one or more of these substances.

FIG. 1 shows aspects of an example gas-treatment facility 102 suitable for purifying a hydrocarbon gas. In facility 102, raw gas from well 104 is conducted to condenser unit 106, where oily waste and aqueous waste are separated from the raw gas via condensation. The sour gas emerging from the condenser unit is then conducted to acid scrubber 108. Traditionally an acid scrubber may enact one or more of amine treatment, Benfield processing, pressure-swing adsorption (PSA) processing, or sulfinol processing.

Figure 2:
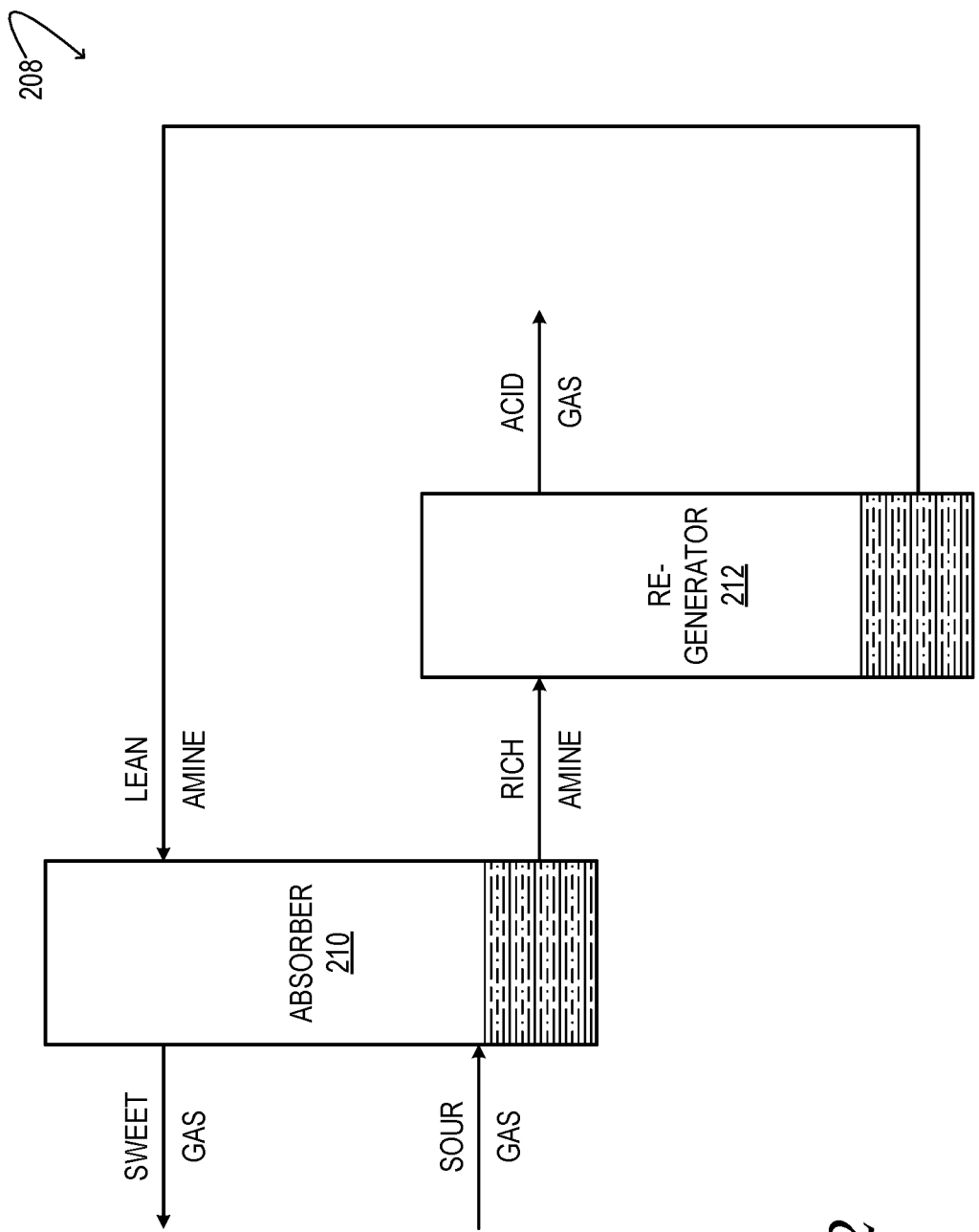
FIG. 2 shows aspects of an example acid scrubber configured to subject hydrocarbon gas to amine treatment.

FIG. 2 shows aspects of an example acid scrubber 208 configured to subject sour hydrocarbon gas to amine treatment. Acid scrubber 208 includes absorber 210 and regenerator 212. The absorber exposes the sour gas to an amine solution and releases sweet hydrocarbon gas. The regenerator receives the amine solution enriched with absorbed acids, such as hydrogen sulfide, boils off and then condenses the acids into an 'acid gas', and returns lean amine to absorber 210.

Returning now to FIG. 1, the acid gas separated from the sour gas stream is conducted to Claus unit 114, where the Claus process is used to oxidize entrained hydrogen sulfide into elemental sulfur. The Claus unit oxidizes the hydrogen sulfide in a multi-step process, involving thermal and catalytic processing. Tail gas emerging from the Claus unit is further processed in tail-treatment unit 116, which may use Scot, Clauspol, or other processing prior to incineration of the 'off-gas' discharge.

From acid scrubber 108, sweet hydrocarbon gas is conducted to dehydration unit 118, which may include a glycol and/or PSA unit, for example. The dehydrated sweet-gas effluent is conveyed to mercury scrubber 120, which may use molecular sieves and/or activated carbon to remove mercury and mercury compounds. Mercury-free, dehydrated sweet gas is then conveyed to nitrogen rejector 122, which uses adsorption, absorption, and/or a cryogenic process to separate the sweet gas into nitrogen-rich and nitrogen-depleted hydrocarbon-gas streams.

Of particular interest in gas-treatment facility 102 is removal of hydrogen sulfide. In scenarios in which the hydrocarbon gas is to be used in a catalytic process (e.g., reforming), removal of hydrogen sulfide is greatly desirable, as sulfur can poison (i.e., deactivate) various heterogeneous catalysts. Even if the hydrocarbon gas is to be burned in a furnace, engine, or turbine, removal of hydrogen sulfide is desirable so as to avoid the formation and release of $SO_2$ and $SO_3$ pollutants. Atmospheric $SO_2$ and $SO_3$ are known to acidify rain water—e.g., $$SO_3 + 2H_2O \rightarrow H_3O^+ + HSO_4^-, \quad (2)$$

which adversely affects ecosystems. Furthermore, in the context of anthropogenic climate change, hydronium ($H_3O^+$) from rain water is believed to reduce the pH of surface water, releasing $CO_2$ from submerged carbonate minerals and limiting $CO_2$ absorption from the atmosphere. Further still, in some scenarios a hydrocarbon gas may contain so much hydrogen sulfide that recovery of the sulfur has non-negligible economic value (vide infra).

As noted hereinabove, in gas-treatment facility 102, hydrogen sulfide can be removed from sour hydrocarbon gas via acid scrubber 208 in conjunction with Claus unit 114. While FIG. 2 provides only a schematic illustration, the skilled reader will appreciate that a state-of-the-art acid scrubber is a large, complex, and expensive unit—factors that may limit its application to high-volume hydrocarbon-gas sources, where capital investment in the acid scrubber is offset by sweet-gas throughput. Conversely, the expense and complexity of the acid scrubber may discourage the harvesting of other valuable sources of hydrocarbon gas, especially stranded sources. Investment in state-of-the-art acid scrubbing may be even harder to justify economically for very low-value hydrocarbon gases, such as flare gas, even when available in large quantities. This is discouraging, because flare-gas incineration, which is typically incomplete, may emit carbon monoxide, benzene, formaldehyde, polycyclic aromatic hydrocarbons, acetaldehyde, acrolein, propylene, toluene, xylenes, ethyl benzene and/or hexane. Moreover, because the combustion exhaust is typically untreated, nitrogen oxides may also be released. The inventors herein have recognized these disadvantages and have devised an alternative solution.

Figure 3:
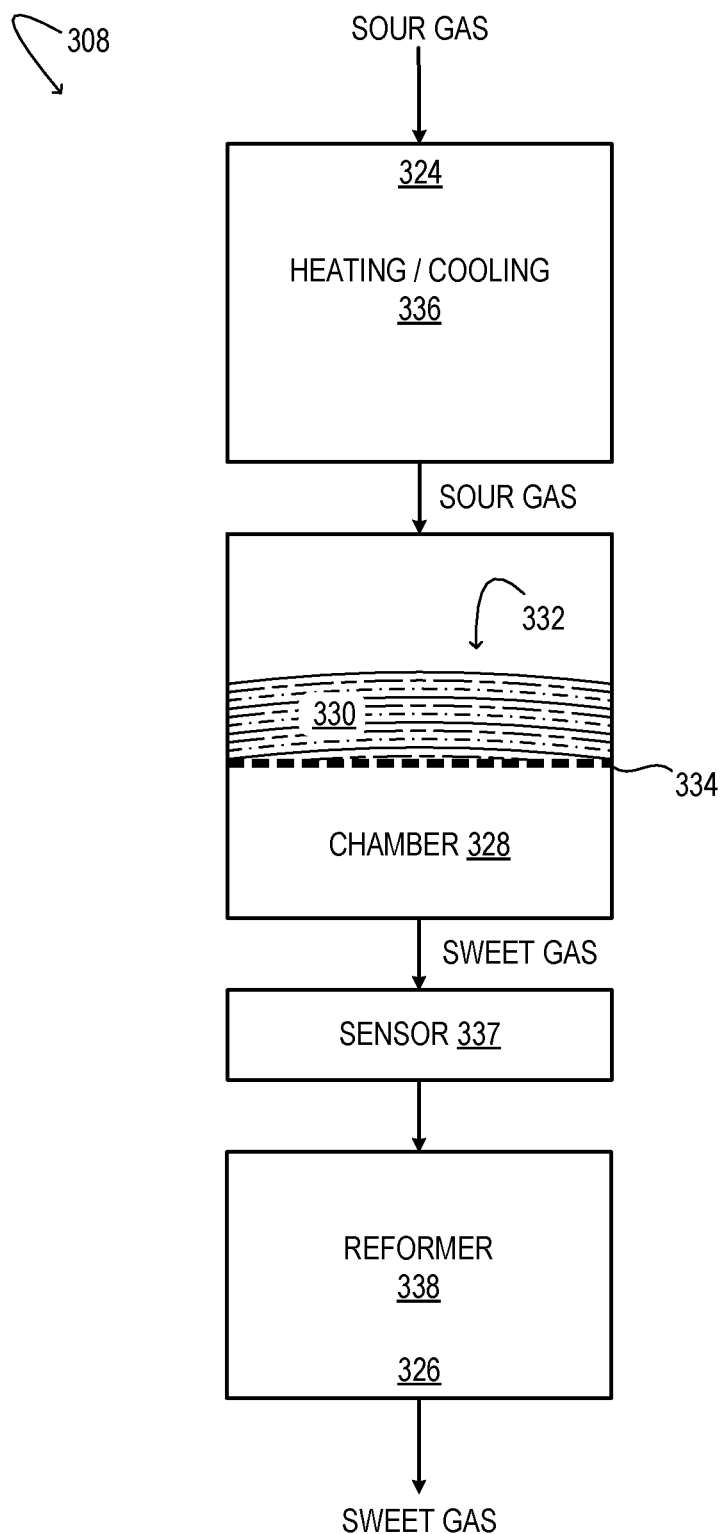
FIG. 3 shows aspects of another kind of acid scrubber in one, non-limiting example.

FIG. 3 shows aspects of another example acid scrubber 308, configured to purify a hydrocarbon gas with hydrogen sulfide as an impurity. Acid scrubber 308 includes an inlet 324 for receiving sour gas and an outlet 326 for releasing sweet gas. Chamber 328 is arranged fluidically downstream of the inlet and upstream of the outlet. The chamber is configured to receive a flow of the sour hydrocarbon gas. Bed 330 is arranged within chamber 328. The bed is configured to intercept the flow of the sour hydrocarbon gas, such that the hydrocarbon gas must percolate through the bed in order to reach the outlet.

Bed 330 includes a particulate form of an active-metal carbide 332. More specifically, active-metal carbide of a predetermined mesh-size range is arranged in the bed. The predetermined mesh-size range may be 10 to 50 mesh in some examples. In other examples, the predetermined mesh-size range may be finer or coarser, broader or narrower. As used herein, the term 'active metal' refers generically to metallic elements of groups IA and IIA of the Periodic Table of the Elements, which form substantially ionic carbides. In more particular examples, this term is restricted to relatively abundant and toxicologically and environmentally benign elements from groups IA and IIA—such as sodium, potassium, magnesium, and calcium. In some examples, accordingly, active-metal carbide 332 comprises a substantially ionic acetylide such as calcium carbide ($CaC_2$) or sodium acetylide ($Na_2C_2$). Acetylides are so named because they form acetylene (HCCH) on hydrolysis. In some examples, active-metal carbide 332 comprises a substantially ionic methide such as magnesium methide ($Mg_2C$). Methides are so named because they form methane on hydrolysis. In some examples, active-metal carbide 332 comprises a substantially ionic allylide such as magnesium sesquicarbide ($Mg_2C_3$). Allylides are so named because they form the allenes methylacetylene ($CH_3CCH$) and propadiene ($CH_2CCH_2$) on hydrolysis. In some examples, active-metal carbide 332 may include a mixture of carbides of different active metals.

The inventors herein reason that each of the carbide anions, $C_2^{2-}$, $C^{4-}$, and $C_3^{4-}$, is a very strong Lewis base. As such, substantially ionic active-metal carbides will react with Lewis acids that may be present in sour hydrocarbon gas. For example, by passing hydrocarbon gas through or over a bed of particulate calcium carbide, the following transformation is expected:

$$H_2S + CaC_2 \rightarrow CaS + HCCH, \quad (3)$$

In that spirit, active-metal carbide 332 is configured to form additional hydrocarbon gas by reaction with the hydrogen sulfide impurity of the sour hydrocarbon gas. The additional hydrocarbon gas may comprise acetylene, methane, methylacetylene and/or propadiene ($CH_2CCH_2$), for example. In some examples the active-metal carbide is configured to form still more hydrocarbon gas by reaction with one or more acid impurities of sour hydrocarbon gas besides hydrogen sulfide.

In a typical implementation, the sour hydrocarbon gas is passed through the active-metal carbide in a particulate state. A stirred bed may be used so as to expose the hydrocarbon gas to a fresh surface of the active-metal carbide and thereby promote heterogeneous reaction. In the illustrated example, acid scrubber 308 includes filter 334. Arranged in chamber 328 fluidically downstream of bed 330, filter 334 is configured to retain active-metal carbide 332 and to transmit sweet hydrocarbon gas without the hydrogen sulfide. In other words, the hydrogen sulfide may be eliminated, substantially eliminated, or reduced significantly in partial pressure. The filter is used to prevent the active-metal carbide particulate from being entrained in the sweet hydrocarbon gas exiting the chamber.

In some examples active-metal carbide 332 may react with acid components of the sour gas occur at ambient temperature. In other examples, elevated or reduced temperatures may be desired. Elevated temperatures may be used to accelerate the reaction—e.g., when the amount of active-metal carbide in the bed nears depletion. Reduced temperatures may be used to discourage thermal runaway, for instance, in the event that the sour gas comprises a high concentration of acid impurities that react exothermically with the active-metal carbide. In the illustrated example, accordingly, acid scrubber 308 includes a heating and/or cooling unit 336 arranged fluidically upstream of chamber 328. In some examples the heating and/or cooling unit may comprise a heat exchanger configured to adjust the temperature of the sour hydrocarbon gas being purified. In some examples the heating and/or cooling unit may comprise a furnace or resistive heater. In some examples the heating and/or cooling unit may comprise a gas-gas or gas-liquid heat exchanger.

Effective 'conversion' of hydrogen sulfide to the additional hydrocarbon gas is useful in scenarios in which the hydrocarbon gas is to be used as fuel, because the additional hydrocarbon gas may be an acceptable addition to the fuel, in the amounts in which it would be produced. In examples in which unsaturated hydrocarbons such as acetylene, methylacetylene and/or propadiene are not a desirable addition to the sweet hydrocarbon gas, the unsaturated hydrocarbons can be saturated by reaction with hydrogen in a downstream reformer—e.g.,

$$HCCH + 2H_2 \rightarrow CH_3CH_3, \quad (4)$$

Accordingly, in the illustrated example acid scrubber 308 includes an optional reformer 338 arranged fluidically downstream of optional sensor 337, which is downstream of chamber 328. A 'reformer' herein may be any state-of-the-art unit configured for one or more of hydrogenation, dehydrogenation, hydrogenolysis, hydrocracking, catalytic reforming, methane reforming, steam reforming, and/or autothermal reforming of a hydrocarbon gas. The term 'reforming conditions' refers analogously to the physico-chemical conditions (e.g., pressure, temperature, catalyst) within a reformer as defined herein. The sensor may be configured to emit an output signal responsive to the partial pressure of any predetermined component of the effluent from chamber 328—e.g., an unsaturated hydrocarbon or an acid impurity such as hydrogen sulfide. The output signal may be used as a control input in the purification process.

Although acid scrubber 308 is configured primarily to scrub $H_2S$ from hydrocarbon gas, it may scrub practically any Lewis acid. In a scenario in which upstream scrubbing of water vapor is incomplete, further dehydration is accomplished in the same bed,

$$H_2O + CaC_2 \rightarrow CaO + HCCH, \quad (5)$$

releasing additional acetylene into the purified product. It will be noted that exposure of active-metal carbide 332 to acids stronger than hydrogen sulfide should be limited, however, so as to prevent re-release of hydrogen sulfide from bound calcium sulfide (CaS).

Figure 4:
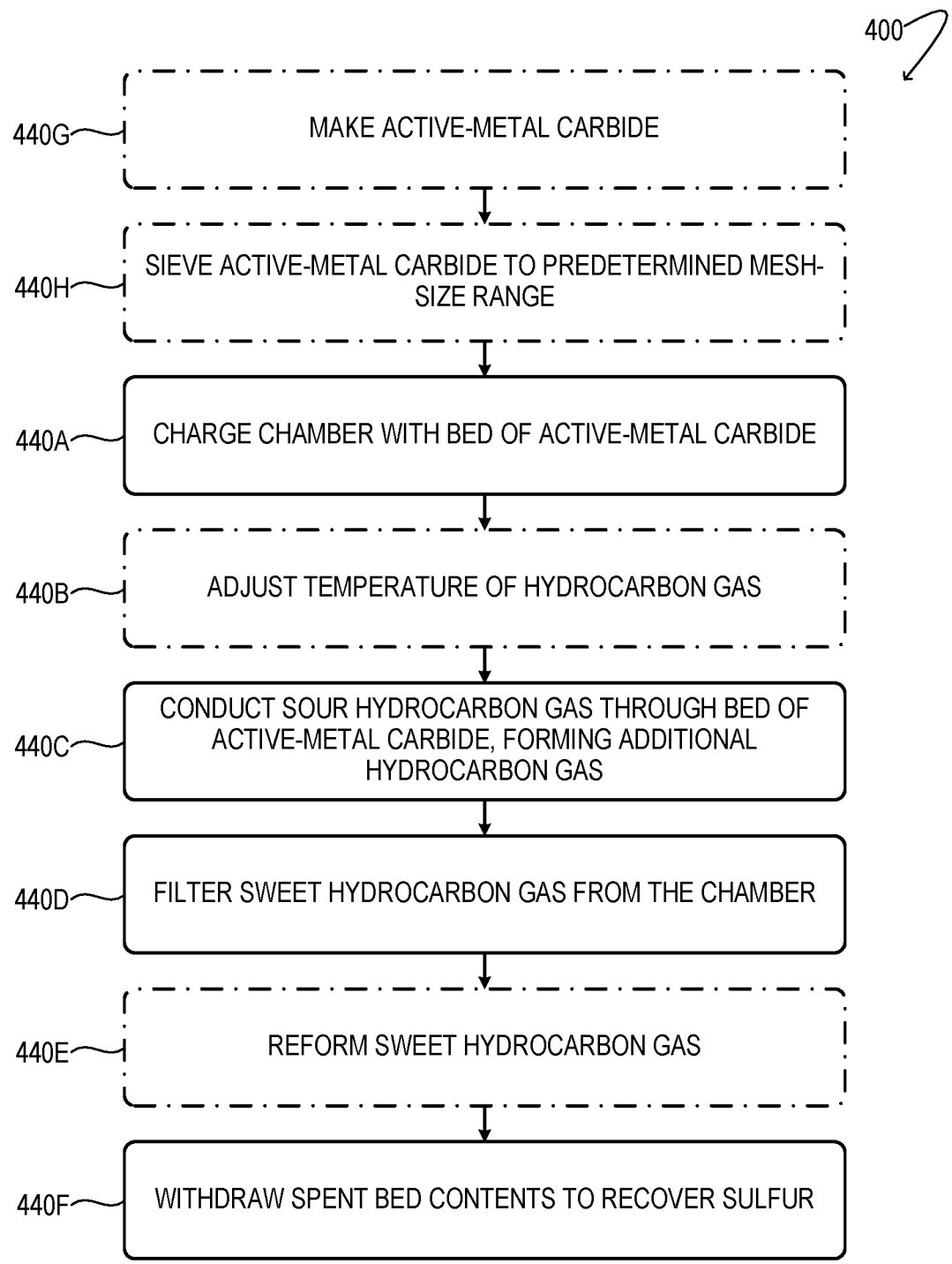
FIG. 4 shows aspects of an example method to purify a hydrocarbon gas with hydrogen sulfide as an impurity.

FIG. 4 shows aspects of an example method 400 to purify a hydrocarbon gas with hydrogen sulfide as an impurity. The purification strategies herein are especially suitable for stranded sources of hydrocarbon gas, because they can be completely or substantially self-contained.

At 440A of method 400 a chamber is charged with a bed of active-metal carbide of a predetermined mesh-size range. In some examples the active-metal carbide includes calcium carbide and/or a magnesium carbide. In some examples the mesh size of the active-metal carbide is 10 to 50 mesh.

At optional step 440B the temperature of a sour hydrocarbon-gas stream is adjusted before the sour hydrocarbon gas is conducted, at 440C, through the bed of active-metal carbide. In some examples and scenarios the temperature may be increased; in other examples and scenarios the temperature may be decreased. For instance, the temperature may be adjusted to within a suitable range.

The sour hydrocarbon gas is then conducted through the bed of active-metal carbide, forming additional hydrocarbon gas by reaction of the active-metal carbide and the hydrogen sulfide. In some examples conducting the sour hydrocarbon gas through the bed of the active-metal carbide comprises conducting at ambient temperature. In some examples, still more hydrocarbon gas is formed by acidification of the active-metal carbide with one or more acid impurities of the sour hydrocarbon gas besides hydrogen sulfide. In some examples conducting the sour hydrocarbon gas through the bed includes active pressurization—i.e., pumping. In some examples, the bed of active-metal carbide is configured to provide minimal fluidic resistance to transmission of the hydrocarbon gas, for higher throughput at lower levels of pressurization. In some examples the sour hydrocarbon gas may be conducted under conditions of controlled mass flow. In some examples, where an $H_2S$ sensor is arranged fluidically downstream of the bed of active-metal carbide, the hydrocarbon flow rate and/or temperature may be varied in a closed-loop manner so as to limit the partial pressure of $H_2S$ in the effluent to an acceptable range. For instance, the temperature may be increased and/or the flow rate decreased with increasing partial pressure of $H_2S$; conversely, the temperature may be decreased and/or the flow rate increased with decreasing partial pressure of $H_2S$. This strategy may be used to balance purification and throughput objectives. In other examples, sensory output may be applied for closed-loop control of reforming conditions, etc.

At 440D sweet hydrocarbon gas without the hydrogen sulfide (vide supra) is filtered from the chamber. At optional step 440E the purified hydrocarbon gas is subjected to reforming conditions to saturate any unsaturated hydrocarbons that may be present in the sweet hydrocarbon gas. At 440F, at suitable intervals, the contents of the bed are withdrawn from the chamber for recovery of the sulfur immobilized therein. In some examples, this action can be coordinated with refilling the bed with fresh active-metal carbide. In some examples, the spent bed may be acidified:

$$H_2CO_3 + CaC_2 \rightarrow CaCO_3 + HCCH, \quad (6)$$

$$H_2CO_3 + CaS \rightarrow CaCO_3 + H_2S. \quad (7)$$

The bed may be acidified fluidicially upstream of a Claus unit (vide supra), so that the sulfur can be recovered using existing technology. Numerous mineral acids are strong enough to effect transformations analogous to Eqs 6 and 7, but carbonic acid is advantageous because the active-metal oxide is easily recovered by heating the carbonate by-product—e.g.,

$$CaCO_3 \rightarrow CaO + CO_2. \quad (8)$$

It should be noted that the global supply of sulfur relies heavily on recovery from petroleum. As a result, any significant reduction in petroleum output (to reduce carbon emissions, for instance) is liable to increase the scarcity of sulfur and encourage environmentally deleterious mining activity. That hypothetical scenario provides additional motivation to reduce the cost of $H_2S$ scrubbing and extend scrubbing technology to stranded, low-volume, and/or low-value sources of hydrocarbon gas.

Continuing in FIG. 4, in some implementations, purification method 400 may include the optional step 440G of making the active-metal carbide. The active-metal carbide could be made in the same processing facility at which the hydrocarbon gas is purified, for instance. At optional step 440H the active-metal carbide is sieved to a predetermined mesh-size range, as noted hereinabove.

Figure 5:
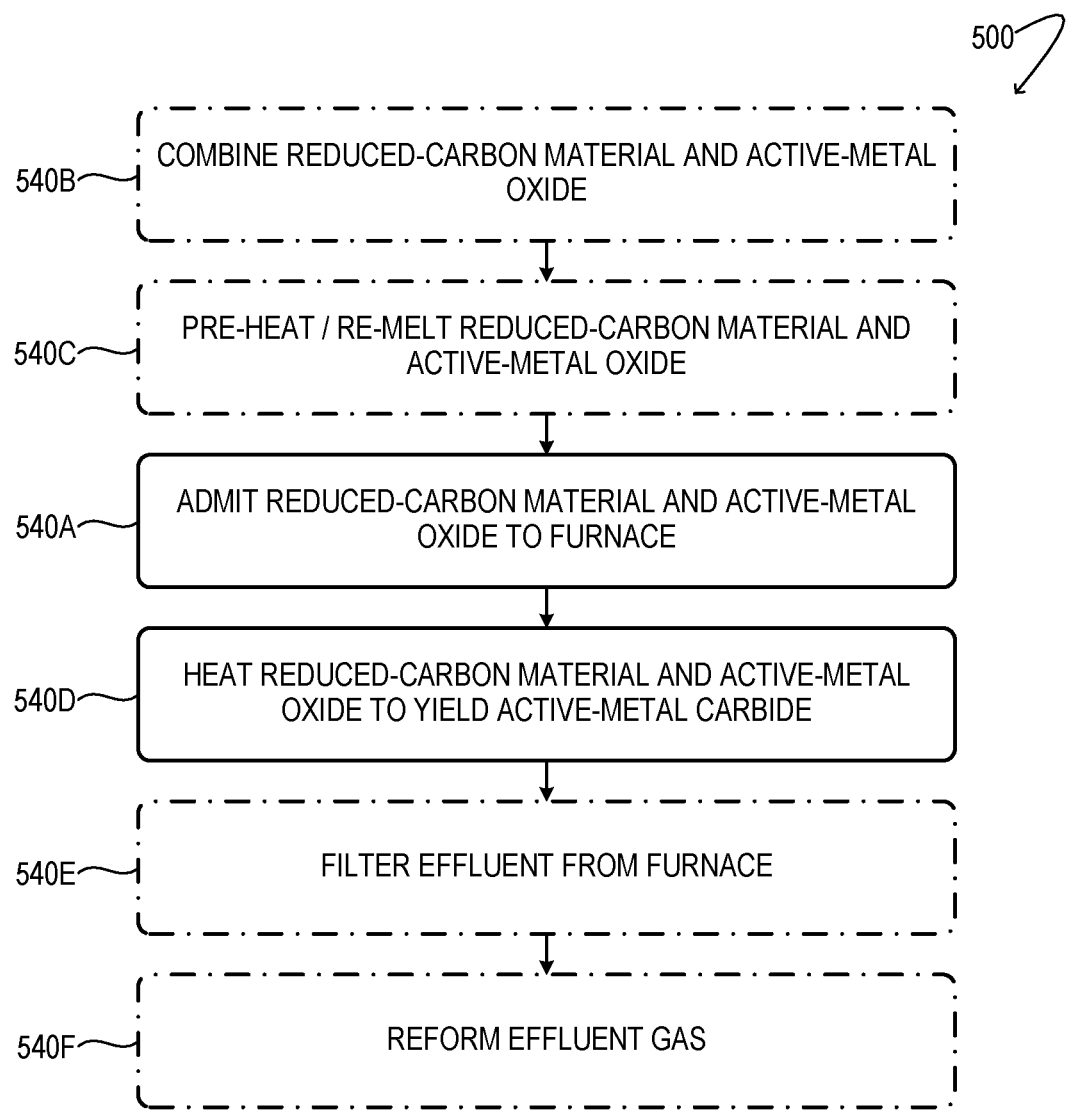
FIG. 5 shows aspects of an example method to make an active-metal carbide.

FIG. 5 shows aspects of an example method 500 to make an active-metal carbide suitable for use in purification method 400. In some scenarios method 500 may be more particular implementation of optional step 440F of method 400.

At 540A of method 500, reduced-carbon material, together with an active metal oxide, is admitted to a furnace for high-temperature processing. As used herein, a 'reduced-carbon material' is any material comprising carbon in an oxidation state less than or equal to zero. The skilled reader is reminded that the oxidation-state formalism assigns an oxidation state of +1 to hydrogen when bonded to a more electronegative atom, assigns an oxidation state of −2 to oxygen when bonded to a less electronegative atom, and assigns an oxidation state of zero to every atom in an elemental state. Accordingly, carbohydrates and elemental carbon both qualify as reduced-carbon material because the carbon therein has an oxidation state of zero. Non-limiting examples of reduced-carbon material include coke, coal, and charable organic material such as biomass, waste plastic, roof shingle, and motor-vehicle tires. In examples in which the reduced-carbon material comprises biomass, the biomass may include plant and animal products of all kinds, including waste products. One form of charable organic material of particular interest, due to its great abundance and high content of hydrogen, is lignin derived from the paper industry.

In some examples, hydrocarbon gas itself may be a source of the reduced-carbon material, at least in part. For instance, purified hydrocarbon gas may be processed under controlled conditions to yield carbon monoxide, and the carbon monoxide may be disproportionated downstream of the oxidation to yield elemental carbon via the Boudouard reaction,

$$2CO \rightarrow C + CO_2. \tag{9}$$

Suitable conditions for forming carbon monoxide from purified hydrocarbon gas include steam reforming and/or aerobic oxidation. In these and other examples, the Bosch reaction may be used to provide elemental carbon from $CO_2$, using hydrogen as a reductant,

$$CO_2 + 2H_2 \rightarrow C + 2H_2O. \tag{10}$$

Similarly, the Sabatier process may be used to convert $CO_2$ into reduced carbon, again using hydrogen as a reductant,

$$CO_2 + 4H_2 \rightarrow CH_4 + 2H_2O. \tag{11}$$

In some examples, the hydrogen input for any of the above processes may be electrolytically derived or captured from the discharge of a plasma/arc reactor, as noted hereinafter.

The furnace used for processing the reduced carbon material and active oxide may be an electric-arc furnace. In some examples, the electric-arc furnace may be operated with power derived from purified hydrocarbon gas. The active-metal oxide and the reduced-carbon material may be conveyed into the furnace in any suitable form. They may be augured in solid form, for instance. Conveyance in softened solid, semisolid, and liquid forms is also envisaged. In some examples, the reduced-carbon material may be conveyed in the form of droplets or a continuous stream. In some examples, the reduced-carbon material may be re-melted with excess heat released in method 500, to facilitate conveyance into the furnace as a softened solid, semisolid, or liquid. Excess heat used to re-melt the reduced-carbon material may be recovered from any stage of the process.

In some examples the reduced-carbon material is combined with the active-metal oxide before entering the furnace, at optional step 540B of method 500. For instance, the reduced-carbon material may be conducted through a chipper, therein chipped to a desirable particle size distribution, and subsequently combined with the active-metal oxide. In other examples, the reduced-carbon material may be shredded or otherwise broken into fragments of suitable size. Active-metal oxide that is crushed, ground, and/or sieved to a suitable particle size may be combined with the fragmented reduced-carbon material at controlled proportions for subsequent reaction.

In some examples the reduced-carbon material, at optional step 540C, may be heated to a melting or softening temperature before or during blending with the active-metal oxide. The mixture of active-metal oxide and reduced-carbon material may also be extruded. In some examples, the extrusion process itself may release heat sufficient to soften the reduced-carbon material. By this or any other suitable mechanism, the active-metal oxide may be encapsulated in the reduced-carbon material—e.g., in extruded form. Extrusions of feedstock comprising blended, controlled proportions of active-metal oxide and reduced-carbon material may be cut or otherwise segmented and stored until needed.

Storage of active-metal oxide encapsulated in reduced-carbon material admits of several advantages. First, encapsulation protects the active-metal oxide from ambient water vapor and carbon dioxide. Without benefit of the encapsulation, exposure of an active-metal oxide to atmospheric constituents is liable to degrade the material to the corresponding hydroxide—e.g.,

$$CaO + H_2O \rightarrow Ca(OH)_2, \tag{12}$$

and/or carbonate,

$$CaO + CO_2 \rightarrow CaCO_3. \tag{13}$$

Second, encapsulation enables the active-metal oxide to be stored in a more environmentally responsible manner, as stored, encapsulated oxide materials are less likely than non-encapsulated materials to be washed into a waterway in the event of excessive rainfall or flooding.

Third, the encapsulated active-metal oxide can be stored with the desired proportion of reduced-carbon material 'locked in' for subsequent reaction. This feature is valuable because method 500 may be engineered to consume various different active-metal oxides and various different forms of reduced-carbon material, even in the same production run. However, the optimal proportion of active-metal oxide to reduced-carbon material may vary depending on the forms being combined. Storage of the constituents already blended at the correct proportion and encapsulated alleviates the need for precise metering of the constituents as they enter the carbide unit (vide infra).

At 540D of method 500, the reduced-carbon material and the oxide of the active metal are heated in the furnace to yield a carbide of the active metal. In a typical example, the active-metal oxide and the reduced-carbon material are pre-heated in a chamber of the furnace maintained at a relatively high pressure N. The active-metal oxide and the reduced-carbon material may be pre-heated to any temperature or range of temperatures suitable to pre-condition the reduced-carbon material for subsequent high-temperature processing. In one non-limiting example, the active-metal oxide and the reduced-carbon material may be pre-heated to about 1300° C.

In examples in which the active-metal oxide and reduced-carbon material are heated in an electric-arc furnace, the furnace may be ignited from an initial cold state by initiating an arc discharge through the gas within the furnace. Once the electric-arc furnace is in operation, gases released from the decomposition of the reduced-carbon material and/or admitted as carrier gas (vide infra) will serve to sustain the arc. Such gases may include hydrogen, although various other arc-sustaining gases are also envisaged. In some scenarios, accordingly, a portion of the gases may be retained in the furnace to improve arc-heating efficiency.

In these and other examples, the active-metal oxide and reduced-carbon material may be heated under a flow of carrier gas admitted either to the furnace or fluidically upstream of the furnace. The carrier gas may be any gas that does not react with the active-metal oxide reactant or with the active-metal carbide at the operating temperatures of the furnace. In some examples, the carrier gas includes one or more of the inert gases helium and argon. Alternatively or in addition, the carrier gas may include one or more of hydrogen, carbon monoxide, and carbon dioxide, for example.

In some examples, the rate of introduction of the carrier gas is controlled so as to influence the reaction kinetics of one or more stages of method 500. Generally speaking, increasing dilution with carrier gas reduces the rate of active-metal carbide formation because it cools the furnace. However, dilution may reduce the particle size distribution of the active-metal carbide, which increases the rate of subsequent heterogeneous reaction. In examples in which a carrier gas is employed, the effluent gas that emerges from the furnace, entraining the active-metal carbide naturally includes the carrier gas.

In some examples, an electric-arc furnace or other high-temperature heating stage may reach a temperature of about 2200° C. In examples in which the active-metal oxide comprises calcium oxide, the reaction yields calcium carbide,

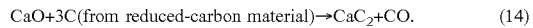

$$CaO + 3C(\text{from reduced-carbon material}) \rightarrow CaC_2 + CO. \quad (14)$$

Other active-metal carbides, such as a magnesium carbide, may be formed in the same manner.

Some reduced-carbon material may include chlorinated and/or fluorinated polymers. Without tying this disclosure to any particular theory, it is believed that the halogen component of the reduced-carbon material will associate with the active metal under the aggressive thermal conditions of Eq 14, forming halide salts of the active metal—e.g., $CaCl_2$, $CaF_2$. This reaction pathway has been proposed in reported carbide synthesis using waste plastic in the reduced-carbon material. This provides at least the advantage of averting fluorinated and/or chlorinated hydrocarbon emission from the process. Moreover, $CaCl_2$ (and by inference $CaF_2$) is known to act as a flux for certain biphasic reactions—e.g., the reaction of $CaC_2$ with $N_2$, to form calcium cyanamide. Accordingly, the presence of a $CaCl_2$ and/or $CaF_2$ impurity in the $CaC_2$ may likewise accelerate reaction with acid constituents of sour gas, providing an additional advantage in scenarios in which the reduced-carbon material includes chlorinated and/or fluorinated waste plastic.

Continuing now in FIG. 5, at optional step 540E, the effluent gas is subjected to a filtration operation, wherein the particles of the entrained active-metal carbide are size-selected upon discharge from the furnace. More particularly, only particles of sufficiently small size may be permitted to exit the furnace, thereby excluding highly agglomerated particles that may be less reactive. In some examples, particles less than 100 microns, more preferably less than 20 microns, may be selected. At optional step 540F the effluent gas from the electric-arc furnace is subjected to reforming conditions, to make additional hydrocarbon—e.g.,

$$CO + 3H_2 \rightarrow CH_4 + H_2O. \quad (15)$$

Figure 6:
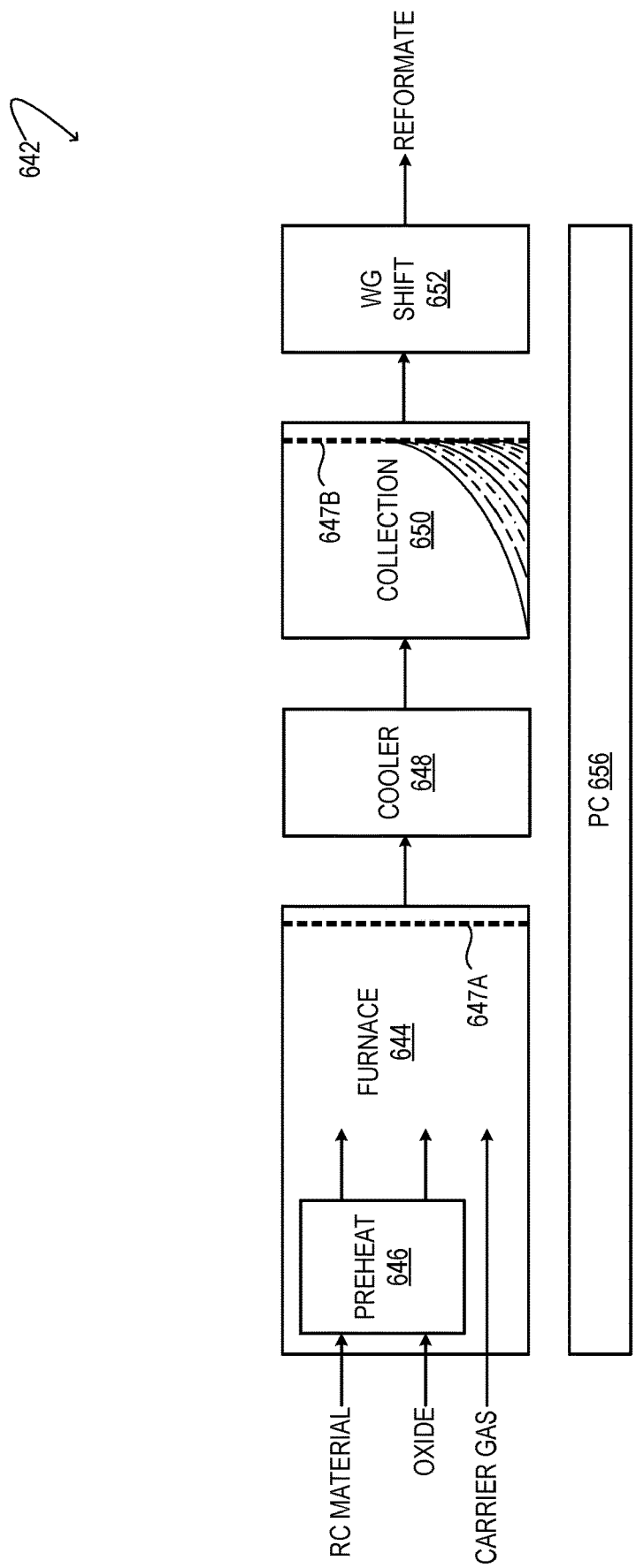
FIG. 6 shows aspects of an example carbide unit in connection to the method of FIG. 5.

FIG. 6 shows aspects of an example carbide unit 642 that may be used in connection with method 500. The carbide unit includes furnace 644 having a pre-heater 646. The pre-heater is configured to receive active-metal oxide and reduced-carbon material and to pre-heat the active-metal oxide and the reduced-carbon material to a temperature suitable for entry into the electric-arc portion of the furnace. The electric-arc portion is configured to receive pre-heated active-metal oxide and reduced-carbon material from the pre-heater together with the carrier gas, if any, used in method 500. More specifically, the electric-arc portion is configured to heat the pre-heated active-metal oxide, reduced-carbon material, and carrier gas to a temperature at which Eq 14 occurs with favorable kinetics. In some examples, the furnace may comprise a rotating arc and/or hollow-electrode electric-arc. In the illustrated example, size-exclusion sieve 647 is arranged fluidically downstream of the electric-arc portion, to transmit only those particles of a mesh-size range appropriate for method 400 and to retain coarser particles. In some examples the electric-arc furnace is powered by energy derived from the purified hydrocarbon gas—i.e., sweet hydrocarbon gas from which the hydrogen sulfide has been removed via method 400.

Carbide unit 642 also includes an optional cooler 648, collection chamber 650, and water-gas shift reactor 652. Furnace 644 is configured to discharge the effluent gas entraining size-selected active-metal carbide to cooler 648. The cooler is configured to cool the effluent gas entraining the active-metal carbide and to discharge the cooled effluent gas entraining the active metal carbide to the collection chamber. The collection chamber is configured to receive and retain the cooled effluent gas entraining the active-metal carbide.

Carbide unit 642 also includes a process controller 656. The process controller is configured to receive sensory input from a plurality of sensors arranged in the carbide unit. Such sensors may include temperature sensors, pressure sensors, flow sensors, fill sensors, and the like. The sensors may be arranged on furnace 644, pre-heater 646, cooler 648, collection chamber 650, and/or water-gas shift reactor 652, for example. The process controller is configured to provide control output to a plurality of actuators arranged in the carbide unit. Such actuators may include flow actuators that control the flow of carrier gas, or the flow between fluidically connected components of the carbide unit. Other actuators may include heating actuators for furnace 644, pre-heater 646, collection chamber 650, and/or water-gas shift reactor 652, and cooling actuators for cooler 648, for example. Process controller 656 includes a computer system configured to execute a process for controlling any, some, or all of the control outputs based on any, some, or all of the sensory inputs, and further based on desirable process setpoints and/or input from a human operator. In some examples, the process controller may be configured to control any, some, or all of the control outputs in a closed-loop manner, based on any, some, or all of the sensory inputs and/or process setpoints.

Figure 7:
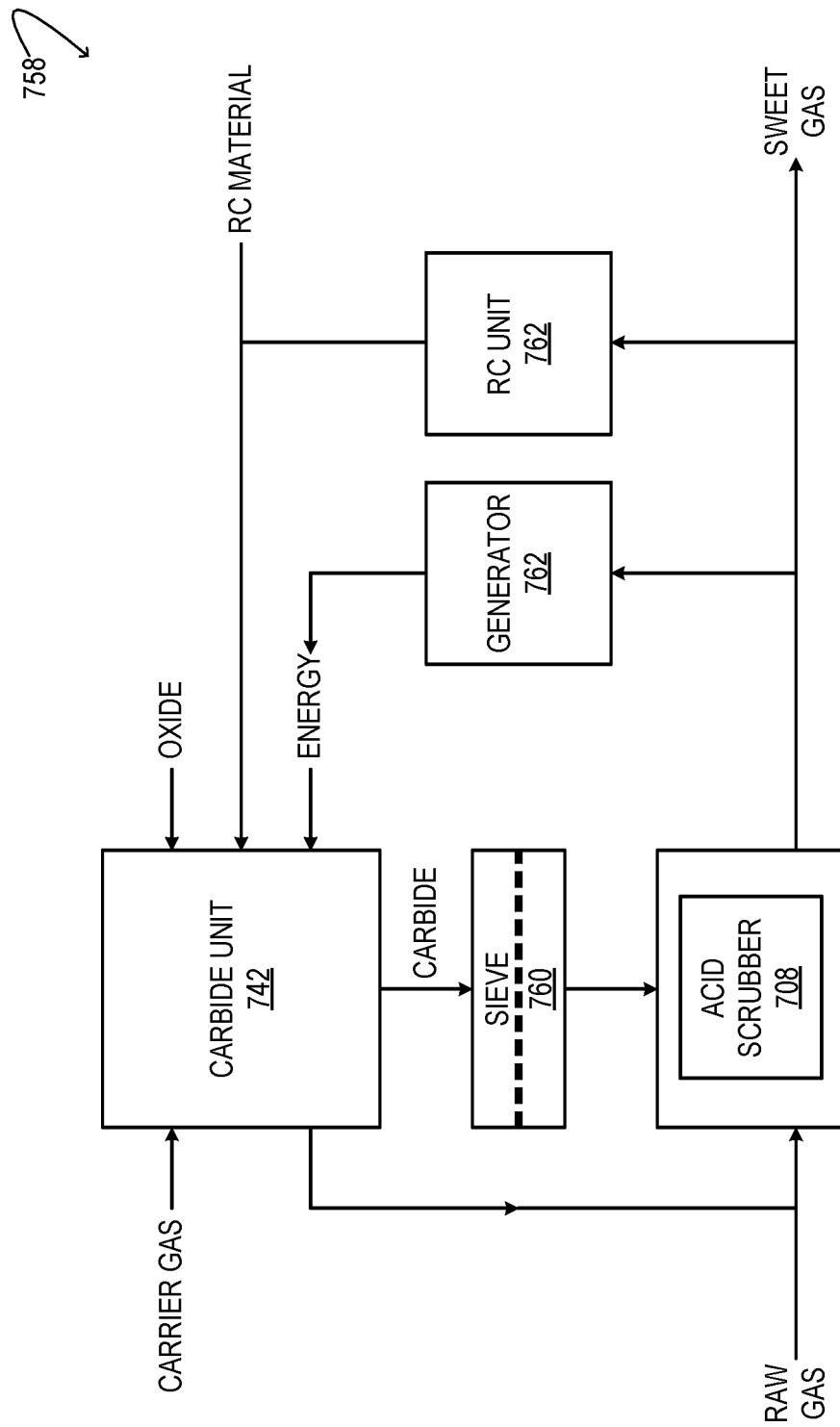
FIG. 7 shows aspects of an example processing facility for purifying a hydrocarbon gas.

FIG. 7 shows, in the form of processing facility 758, an implementation environment for the methods and configurations herein. Processing facility 758 comprises a gas-treatment facility 702 including an acid scrubber 708, a carbide unit 742, sieve 760, generator 762, and reduced-carbon unit 762. The reduced-carbon unit makes reduced-carbon material for the carbide unit. The sieve is configured to sieve the active-metal carbide to the predetermined mesh-size range.

No aspect of the foregoing drawings or description should be interpreted in a limiting sense, because numerous variations, extensions, and omissions are also envisaged. For instance, certain forms of reduced-carbon material may contain significant amounts of sulfur. Examples include motor-vehicle tires, which are made of vulcanized rubber. When the tires are pyrolyzed, hydrogen sulfide and other sulfur compounds may be discharged from the tires. Such gas may be passed over or through an acid scrubber as described herein in order to trap the sulfur.

As shown in FIG. 6, effluent gas from a carbide unit, which comprises CO (from Eq 14), may be passed over a water-gas shift catalyst, to yield hydrogen,

$$CO + H_2O \rightarrow CO_2 + H_2. \quad (16)$$

The mode of utilization of the hydrogen from Eq 16 is not particularly limited. In some examples, the hydrogen may be included in the stream of carrier gas supplied to carbide unit 642. Incorporation of hydrogen into the carrier gas may be more desirable than incorporation of methane itself, which may contain impurities that introduce undesirable process variables. In other examples, the hydrogen may be consumed in a reforming process or converted to heat or electrical energy for the electric-arc furnace, or elsewhere in method 500.

In some examples, the energy needed to make the active-metal carbide can be derived from purified hydrocarbon gas itself. In other examples, the energy can be wind- or solar-derived. The active-metal component of the active-metal carbide can be recycled indefinitely, as described hereinabove. Further, as virtually any reduced-carbon material can serve as the carbon source, the end-to-end process does not require extensive material transport. Charring, as needed, may be accomplished using energy derived from the purified hydrocarbon gas.

In still other examples, purified hydrocarbon gas may be admitted directly to the arc furnace. It is believed that the hydrocarbon will react with lime to yield refractory calcium carbide and release both hydrogen and carbon monoxide. The interested reader is referred to "CaC$_2$ Production from CaO and Coal or Hydrocarbons in a Rotating-Arc Reactor" by Chi S. Kim, et al. in *Ind. Eng. Chem. Process Des. Dev.* Vol. 18, No. 2, 1979, which is hereby incorporated by reference herein for all purposes. The following additional documents are also hereby incorporated herein by reference for all purposes:

R. K. Graupner and J. D. Hultine, PRODUCTION AND USE OF CYANOGUANIDINE AND CYANAMIDE, International Patent Application Publication Number WO 2012/123378 A1, 20 Sep. 2012.

R. K. Graupner and J. D. Hultine, PRODUCTION AND USE OF CYANOGUANIDINE AND CYANAMIDE, International Patent Application Publication Number WO 2012/123380 A2, 20 Sep. 2012.

J. Dustin Hultine and Robert Kurt Graupner, INTEGRATED SYNTHESIS OF COMMODITY CHEMICALS FROM WASTE PLASTIC, U.S. Pat. No. 11,180,371 B2, 23 Nov. 2021.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be conducted in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to purify a hydrocarbon gas with hydrogen sulfide as an impurity, the method comprising:
   charging a chamber with a bed of active-metal carbide of a predetermined mesh-size range;
   conducting the hydrocarbon gas through the bed of active-metal carbide, forming additional hydrocarbon gas by reaction of the active-metal carbide and the hydrogen sulfide; and
   filtering from the chamber the hydrocarbon gas without the hydrogen sulfide.

2. The method of claim 1 wherein the additional hydrocarbon gas comprises one or more of acetylene, methane, methylacetylene, and propadiene.

3. The method of claim 1 wherein the active-metal carbide includes calcium carbide and/or a magnesium carbide.

4. The method of claim 1 further comprising forming still more hydrocarbon gas by reaction of the active-metal carbide and one or more acid impurities of the hydrocarbon gas besides hydrogen sulfide.

5. The method of claim 1 further comprising making the active-metal carbide.

6. The method of claim 5 further comprising sieving the active-metal carbide to the predetermined mesh-size range.

7. The method of claim 5 wherein the active-metal carbide is a carbide of an active metal, and wherein making the active-metal carbide includes heating reduced-carbon material and an oxide of an active metal in an electric-arc furnace.

8. The method of claim 7 wherein the hydrocarbon gas without the hydrogen sulfide is purified hydrocarbon gas, the method further comprising powering the electric-arc furnace with power derived from the purified hydrocarbon gas.

9. The method of claim 7 wherein the reduced-carbon material includes one or more of plastic, lignin, and motor-vehicle tires.

10. The method of claim 7 further comprising subjecting effluent gas from the electric-arc furnace to reforming conditions, to make still more hydrocarbon gas.

11. The method of claim 1 wherein hydrocarbon gas without the hydrogen sulfide is purified hydrocarbon gas, the method further comprising subjecting the purified hydrocarbon gas to reforming conditions to saturate the additional hydrocarbon gas.

12. The method of claim 1 wherein conducting the hydrocarbon gas through the bed of the active-metal carbide comprises conducting at ambient temperature.

13. The method of claim 1 further comprising adjusting a temperature of the hydrocarbon gas before conducting the hydrocarbon gas through the bed of the active-metal carbide.

\* \* \* \* \*